Oct. 4, 1932.  J. RHEINBERG  1,881,132
SPECTACLES
Filed July 7, 1930   3 Sheets-Sheet 1
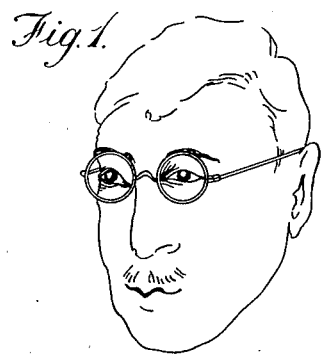
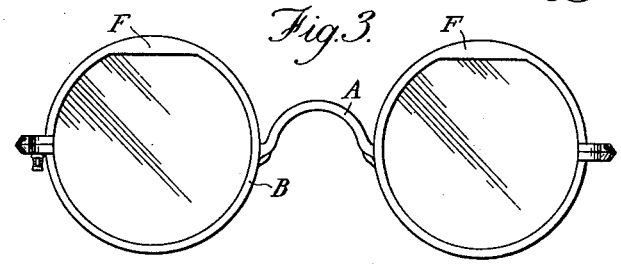
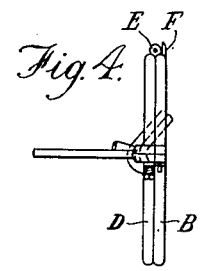
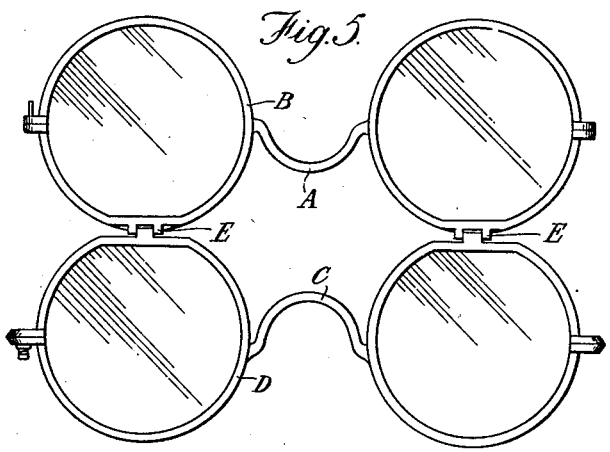
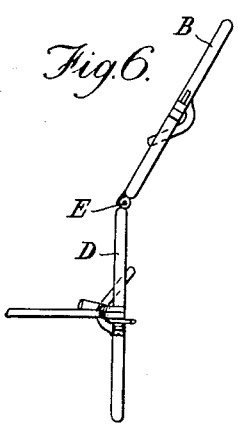
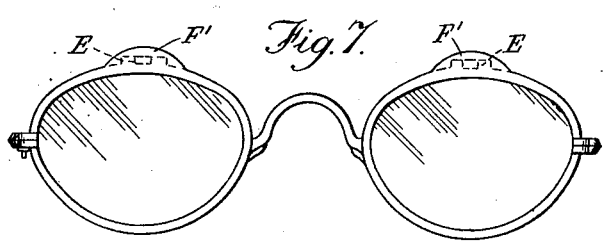
INVENTOR
Julius Rheinberg
ATTORNEY Oct. 4, 1932.  J. RHEINBERG  1,881,132
SPECTACLES
Filed July 7, 1930  3 Sheets-Sheet 2

INVENTOR
Julius Rheinberg,
BY
ATTORNEY

Oct. 4, 1932. J. RHEINBERG 1,881,132
SPECTACLES
Filed July 7, 1930 3 Sheets-Sheet 3

INVENTOR
Julius Rheinberg,
BY
ATTORNEY

Patented Oct. 4, 1932

1,881,132

UNITED STATES PATENT OFFICE

JULIUS RHEINBERG, OF LONDON, ENGLAND

SPECTACLES

Application filed July 7, 1930, Serial No. 466,225, and in Great Britain July 24, 1929.

This invention relates to spectacles or eyeglasses of the kind in which a supplementary pair of lenses or glasses are hinged on to the main frame so that they may either be brought down in front of the fixed pair of lenses or turned aside.

The main purpose of spectacles of this description is to dispense with the necessity, in the case of people who require different lenses for distance and for near vision, of having two separate pairs of spectacles and so avoiding the inconvenience of frequently changing from the one pair to the other. They also supplant spectacles with bifocal lenses, which have a number of disadvantages. There are also many other purposes for which spectacles of this description are useful, some connected with certain defects and diseases of the eye, some in which coloured or tinted glasses are brought in front of the others, for the suppression of glare of the sun or snow, or for use in motoring, or when spectacles are to be available for magnifying or stereoscopic work as well as for their ordinary purpose.

Whilst spectacles of this description adapted to near and distant vision are to all intents and purposes unknown to the public or in the trade, the first suggestion for such spectacles dates back to the end of the eighteenth century, and since then they have not infrequently been reinvented without ever coming into popular use. This may be accounted for by their inconvenience in handling, or by their ugliness. In the earlier forms both lenses had to be moved separately. Later forms in which both lenses move together show conspicuous and ugly bars or projections, apart from the fact that the bridges or nose pieces of both pairs of spectacles were plainly visible when they were worn. The history of spectacles shows that aesthetic considerations have always played a significant part, so that the form and appearance of spectacles is of unusual importance. Lastly, either no or insufficient means were provided to compensate for the wear and tear of hinges, or for securely maintaining the auxiliary spectacles in position when in and out of action.

My invention has amongst its objects to produce a pair of spectacles or eye glasses in which both of the auxiliary lenses move together and which, when the auxiliary lenses or glasses are in their operative position, are practically indistinguishable from ordinary spectacles or eye glasses. It also provides for securing the lenses or glasses firmly together in the operative position, which is a matter of importance for example when the wearer is walking or descending or ascending stairs, whereby any change in the conditions of vision is liable to cause a serious accident. My said invention also provides a durable construction adapted to resist normal wear and tear.

According to my invention, the auxiliary frame is made of the same shape and of substantially the same or slightly larger size than the main frame, so that the eye rims and bridge of the auxiliary frame cover and conceal the corresponding parts of the main frame, a catch independent of the hinge or hinges being preferably provided for retaining the auxiliary frame securely in its operative position, i. e. that in which the primary and supplementary lenses or glasses act in conjunction. Means can also be provided for retaining the auxiliary frame in any position to which it may be adjusted.

The lenses in the main frame are generally corrected for near vision, and the supplementary ones so corrected that when used in conjunction with the others, the wearer's sight is accommodated for distant vision. They may however be fitted with lenses or glasses of any kind suitable to the particular purpose in view.

To render the hinges attached to the upper part of the eye frames as inconspicuous as possible, they may be disposed either above the eye frames or behind the eye frames of the primary pair, and they may be given a rounded or curved shape in outline, and in the case of spectacles with circular lenses the tops of the eye frames may be flattened over a small segment and the hinges attached to the top may be given the same shape in outline as the missing segment, so that the appearance of the eye frame remains substantially circular. The hinges may also be completely concealed by small curved shields arranged in front of them and attached to the eye frames or hinge parts of the auxiliary spectacles.

In order to maintain the auxiliary frame in its operative position, a suitable spring catch can be provided e. g. on the main frame, this catch being adapted to engage yieldingly with a projection on one side of the auxiliary frame as the latter is moved into its operative position. If desired a suitable helical torsion or other spring or springs can be arranged in conjunction with the hinges for automatically moving the auxiliary frame into its raised or inoperative position when the above mentioned catch is released, for example the bodies of the springs may be arranged over the pins of the hinges, the ends of the springs engaging with hinge members on the main and auxiliary frames respectively or directly with such main and auxiliary frames. In this case a spring lever or other catch positively engaging the auxiliary frame may be advantageously employed.

By this means, the supplementary front can be raised or closed by hand or automatically without touching and thereby soiling the lenses or glasses, and without imparting any appreciable or disturbing jerk to the spectacles. Or suitable elastic or other friction may be provided in or in connection with the hinges to compensate for wear and tear and for enabling the auxiliary frame to remain at any position to which it may be moved, for example a cylindrical helical spring may be arranged around one or both of the hinge pins, such spring or springs acting to press the hinge members one against the other.

In raising the supplementary frame by hand, the forefinger and thumb respectively grip the top and bottom of an eyeframe, turning it around its hinges. In the automatic forms only the parts near the side catch are touched. In both forms the supplementary front is brought down and closed by placing the forefinger over the side joint of the supplementary frame and the thumb under the side joint of the main frame, pressing the former toward the latter.

Another modification, suitable when the auxiliary spectacles are only required for a certain time, for example on a motor trip or when touring, provides for their complete detachment from the main frame. I may effect the separation by a partial withdrawal of the pins of the hinges against the action of a helical or other spring.

Furthermore the auxiliary member can be provided with pins or projections adapted to fit frictionally in sleeves hinged to the main frame, so as to enable the auxiliary frames to be conveniently removed and replaced.

My improved spectacles or eye glasses will be inconspicuous when provided with lenses for near and distant vision in the normal way, when used in the street and in general when inconspicuousness is of importance, the supplementary spectacles being only noticeable at times when it scarcely matters, e. g. when the wearer is engaged in reading, writing or doing close work.

In the accompanying drawings, I have shown how my said invention may be conveniently and advantageously carried into practice, viz:

Figure 1 is a view showing the improved spectacles in use in their closed position for distant vision, and Figure 2 is a similar view showing the spectacles in their open position for near vision.

Figures 3 and 5 show the spectacles separately drawn to an enlarged scale in corresponding positions to Figures 1 and 2 respectively.

Figure 4 is an end view corresponding to Figure 3, and

Figure 6 an end view corresponding to Figure 5.

Figure 7 is a front view of another form of spectacles made according to the present invention.

Figure 8:
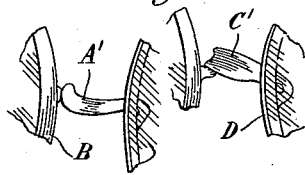

Figure 8 shows the bridge members of a pair of spectacles made according to the invention.

Figure 9:
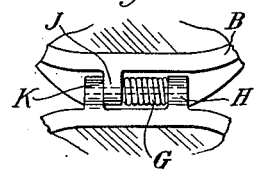
Figure 10:
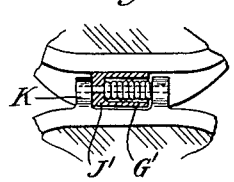
Figure 11:
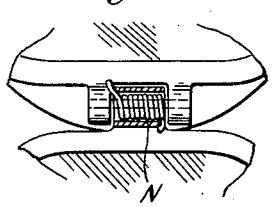

Figures 9, 10 and 11 are views showing three forms of hinge.

Figure 12:
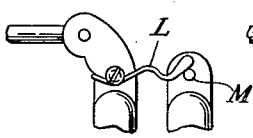
Figure 13:
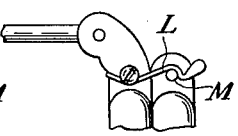
Figure 14:
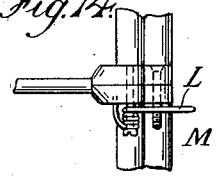

Figures 12, 13 and 14 show a catch for securing together the two frames of the spectacles in its disengaged and engaged positions respectively.

Figure 15:
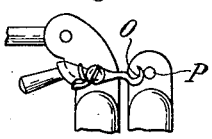
Figure 16:
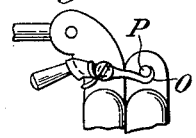
Figure 17:
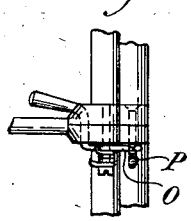

Figures 15, 16 and 17 are corresponding views to Figures 12, 13 and 14, showing an alternative form of catch.

Figure 18:
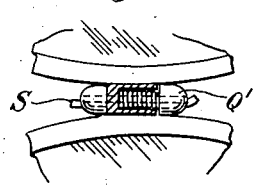
Figure 19:
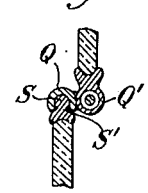
Figure 20:
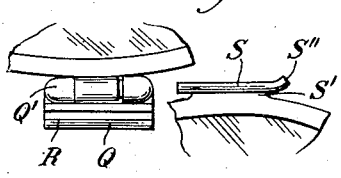

Figures 18, 19 and 20 are respectively a front elevation and a transverse section with a hinge assembled, and a front elevation with the parts of the hinge detached from one another, showing a further form of hinge.

Figure 21:
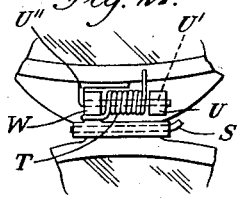
Figure 22:
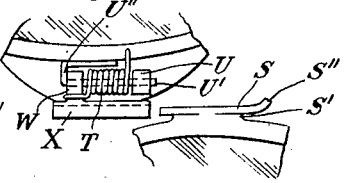

Figures 21 and 22 are front elevations of a further form of hinge respectively with the parts assembled and detached.

Figure 23:
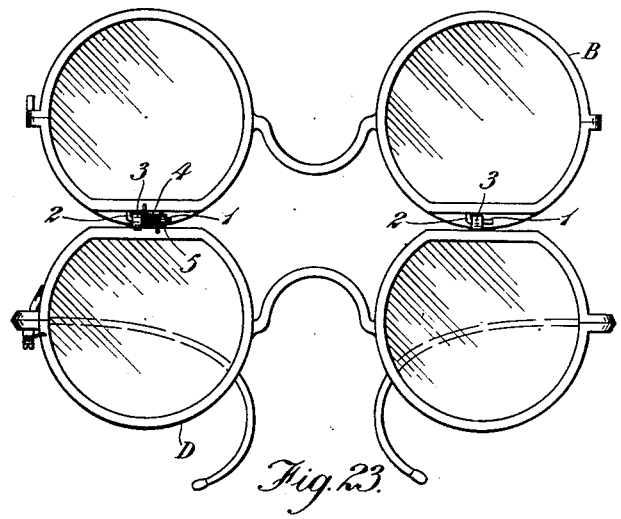

Figure 23 is a view showing a further form of the improved spectacles in their open position for near vision.

Figures 24, 25:
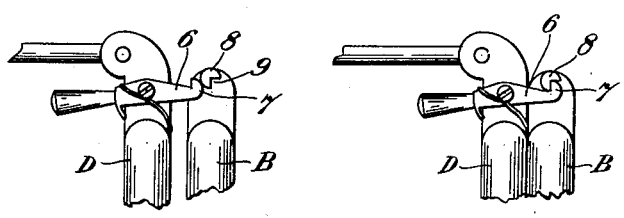

Figures 24 and 25 show a further form of catch respectively in an inoperative position and in an operative position.

Referring to Figures 1 to 6, the bridge A of the auxiliary frame B is made of substantially the same size and shape as the bridge C of the main frame D, so that when the frames are superposed as shown in Figures 1, 3 and 4, the presence of the auxiliary frame is not noticeable. The hinge E is furthermore arranged on a part of the eye frame which forms a flat in the circular outline of each lens, so that, by arranging curved shields F on the corresponding parts of the auxiliary frame in front of the hinges, the circular outline of the eye frame of the spectacles as seen from the exterior is preserved.

Figure 7 shows the invention applied to spectacles fitted with pantoscopic lenses, and provided with hinge shields F'.

In Figure 8 the main frame D is shown with a modified form of bridge C' made of the concave or "cylinder" type, the bridge A' of the auxiliary frame being of an ordinary type and being adapted to fit into the concave front part of the bridge C' when the auxiliary frame is folded on to the main frame.

The hinges may be of the form shown in Figure 9, in which visible springs G surrounding the pivot pins H press brackets J on the auxiliary frame B against brackets K on the main frame. If desired a spring G may be fitted in one only of the hinges H, J. By the friction so produced, the auxiliary frame B will be retained in any position to which it is moved. A similar friction joint is shown in Figure 10 in which the brackets on the auxiliary frame B are made of tubular form J', so as to enclose the springs G'. When the auxiliary and main frame B, D are folded closely one against the other, they are retained in such position by means of a spring catch L on the main frame, see Figures 12, 13 and 14, engaging a pin M on the auxiliary frame, the spring catch being of such form that it is pressed back and automatically engages the pin M as the auxiliary frame approaches the main frame. In raising the auxiliary frame, the spring catch is pressed back by the pin M. The pin M may be formed by an extension of one of the screws in the joint.

In the alternative form of hinge shown in Figure 11, a cylindrical spiral spring N is stressed so that by the action of its ends on the auxiliary and main frames, the said frames are normally held in the position shown in Figures 2 and 6, e. g. at an angle of about 135 to 150 degrees from their closed position, the shields F forming stops. Stops may also be arranged on the eye frames for this purpose. The auxiliary frame is held in its closed position, Figures 1, 4 and 16 against the action of the springs N by means of a spring-controlled catch lever O, Figures 15, 16 and 17, which automatically engages a pin P on the auxiliary frame, as the latter is moved into its closed position. The catch lever is provided on either side with a stop for limiting its movement. In this case also one only of the hinges may be provided with a spring N.

Figures 18 to 20 show a form of hinge which permits of the auxiliary frame being readily detached when not required. This hinge comprises an intermediate link or sleeve member Q hinged at Q' to the auxiliary frame and having a slot R opening into the interior of the sleeve to receive the stem S' of a rod or rib S on the main frame, which is held frictionally in said sleeve when the auxiliary frame is in use and which can be withdrawn therefrom when not required. One end of each rod S may be bent as at S'' to form a stop to limit the distance the rod may enter the respective sleeve. This hinge may be advantageously used when the auxiliary frame is provided with, e. g. anti-dazzle glasses, which are only required at special times.

Figures 21 and 22 show an arrangement of hinge for use with detachable auxiliary frames in which a cylindrical spiral spring T is stressed so that by the action of its ends upon the auxiliary frame and on a hinge member W formed upon a sleeve member X the said frame is held in the position shown in Figure 2. The spring is mounted upon a hinge pin U' between a stop U fixed upon the hinge pin U' and the hinge member W. The hinge pin U is here secured at one end U'' only to the eye rim, the other end being unsupported as shown. This form of hinge may obviously be applied to the other forms of spectacle frame hereinbefore described, e. g. with reference to Figures 3, 4, 5, 6, 7, 9, 10 and 11. The sleeve member X has a slot formed therein to receive the stem S' of a rod or rib S on the main frame. One end of the rib S may be bent as at S'' to form a stop. A spring controlled catch lever, such as for example, as shown in Figures 15 and 16, normally retains the auxiliary frame in front of the main frame in an operative position, and upon the catch being released the spring T moves the auxiliary frame to the position shown in Figure 2.

As shown in Figure 23 the auxiliary frame B is secured to the main frame D by hinge pins 1, which are bent at 2 to form brackets on the auxiliary eye rims and which are adapted to turn in hinge brackets 3 on the main eye rims. If desired this form of hinge pin may replace one of the hinges in the constructions shown in Figures 18 to 20, and in Figures 21 and 22, i. e. it would replace the hinge unprovided with a spring, thus considerably simplifying the construction. In other cases a helical spring 4 is arranged around one of the hinge pins 1 and is stressed to move the auxiliary frame to the position shown, whilst a collar 5 is provided on the said hinge pin to prevent displacement of the helical spring. If desired the hinge pin may be screw-threaded and the collar 5 be screwed thereon and adjusted to any required position.

A further form of spring catch is shown in Figures 24 and 25 and comprises a spring controlled lever 6 provided with a hooked or curved end 7, and a pin 8 having a notch or cut-out portion 9. The lever 6 also has secured thereto on either side thereof stops for limiting the movement of the said lever. Upon movement of the auxiliary frame in front of the main frame, to an operative position, the pin 8 first engages the curved end 7 of the lever 6 and displaces the lever, the subsequent movement of the auxiliary frame nearer the main frame allowing the lever to be moved, by the spring acting thereon, to a position in which the hooked end of the lever engages the notch or cut out portion 9. By this means the auxiliary frame is very securely retained in its operative position.

I claim:

1. Spectacles comprising a main frame with eye rims and a nose bridge, a rigid auxiliary frame consisting of eye rims and a nose bridge, such auxiliary eye rims and nose bridge being of the same shape and substantially the same size as the main eye rims and nose bridge, independent hinge members secured to the registering pairs of eye rims, respectively, and serving to connect the main frame and the auxiliary frame, a catch pin on said auxiliary frame, a helical spring arranged around the pin part of one of the hinge members of an eye rim and a spring controlled catch lever adapted to engage said catch pin and pivotally mounted on a side joint of the main frame and independent of the hinges for retaining the auxiliary frame in register with the main frame.

2. Spectacles comprising a main frame with eye rims and a nose bridge, a rigid auxiliary frame consisting eye rims and a nose bridge, such auxiliary eye rims and nose bridge being of the same shape and substantially the same size as the main eye rims and nose bridge, independent hinge members secured to the registering pairs of eye rims, respectively, so as to connect the main frame and the auxiliary frame and permit of such frames being brought into registration with one another, a helical spring arranged around a pin part of one of the hinge members of an eye rim, said helical spring being stressed to move the auxiliary frame around the hinges away from the main frame, a projection upon a side joint of the auxiliary frame, a pivotal catch lever mounted on a side joint on the main frame, which coacts with said projection to retain the auxiliary frame in the position in which it registers with and conceals the main frame, and a helical spring acting on the said pivotal catch.

3. Spectacles comprising a main frame with eye rims and a nose bridge, a rigid auxiliary frame consisting of eye rims and a nose bridge, such auxiliary rims and nose bridge being of the same shape and substantially the same size as the main eye rims and nose bridge, independent hinge members secured to the registering, pairs of eye rims, respectively, so as to connect the main frame and the auxiliary frame, shields to conceal said hinge members, a helical spring arranged around a pin part of one of the hinge members of an eye rim, said helical spring being stressed to move the auxiliary frame around said hinges away from the main frame, a projection provided with a notch arranged upon said auxiliary frame, a pin on the main frame, a pivotal catch lever having a hooked end mounted on the said pin, the hooked end of the said spring catch engaging the notch in said projection to retain the auxiliary frame in a position in which it registers with and conceals the main frame, and a helical spring arranged around the catch lever supporting pin and acting upon said catch lever.

4. Spectacles comprising a main frame with eye rims and a nose bridge, a rigid auxiliary frame consisting of eye rims and a nose bridge, such auxiliary eye rims and nose bridge being of the same shape and substantially the same size as the main eye rims and nose bridge, independent hinge members secured to the registering pairs of eye rims, respectively, so as to connect the main frame and the auxiliary frame, a helical spring arranged around the pin part of a hinge so as to cause the members of such hinge to engage frictionally with one another, a catch pin on said auxiliary frame and a catch arm on said main frame which is movable transversely to the plane of the lenses of the main frame and which independently of the hinges retains the auxiliary frame in a position wherein it registers with and conceals the main frame, and a helical spring that acts upon the pivotal catch lever.

5. Spectacles comprising a main frame with eye rims and a bridge, a rigid auxiliary frame consisting of eye rims and a bridge, such auxiliary eye rims and bridge being of the same shape and substantially the same size as the main eye rims and bridge, a rib on one eye rim of the main frame, a sleeve provided with a slot and adapted to engage frictionally said rib, co-acting hinge members on said sleeve and on one eye rim of the said auxiliary frame respectively, one of said members comprising a hinge pin, a helical spring arranged around said hinge pin, and coacting and easily separable hinge members mounted on the second eye rims of the main frame and the auxiliary frame, respectively.

6. Spectacles comprising a main frame with eye rims and a bridge, a rigid auxiliary frame consisting of eye rims and a bridge, such auxiliary eye rims and bridge being of the same shape and substantially the same size as the main eye rims and bridge, a rib on one eye rim of the main frame, a sleeve provided with a slot and adapted to engage frictionally said rib, a hinge member on said sleeve, a hinge member comprising a hinge pin on one eye rim of the auxiliary frame, a helical spring arranged around said hinge pin and having its ends engaging said sleeve and said auxiliary frame respectively, said helical spring being stressed to move the auxiliary frame around the hinge pin away from the main frame, means for retaining the pairs of eye rims on the main and auxiliary frames in their registering positions, respectively, and coacting easily separable hinge members respectively mounted on the second eye rims of the main and auxiliary frames.

7. Spectacles comprising a main frame with eye rims and a bridge, a rigid auxiliary frame consisting of eye rims and a bridge, such auxiliary eye rims and bridge being of the same shape and substantially the same size as the main eye rims and bridge, a rib on the main frame, a sleeve provided with a slot and adapted to engage frictionally said rib, a hinge connecting said sleeve and one eye rim of said auxiliary frame, a helical spring arranged around the hinge pin of said hinge and having its ends engaging said sleeve and said auxiliary frame respectively, said helical spring being stressed to move the auxiliary frame around the hinge pin away from the main frame, a hinge bracket on the second eye rim of the main frame, a hinge pin on the second eye rim of the auxiliary frame and engaging said hinge bracket, and means for retaining the auxiliary frame in a position in which it registers with and conceals the main frame.

8. Spectacles comprising a main frame with eye rims and a bridge, a rigid auxiliary frame consisting of eye rims and a bridge, such auxiliary eye rims and bridge being of the same shape and substantially the same size as the main eye rims and bridge, a rib on the main frame, a sleeve provided with a slot and adapted to engage frictionally said rib, a hinge member on said sleeve, a hinge member comprising a hinge pin on the auxiliary frame, said hinge pin extending through the hinge member on said sleeve, a helical spring arranged around said hinge pin and having its ends engaging said sleeve and said auxiliary frame respectively, said helical spring being stressed to move the auxiliary frame around the hinge pin away from the main frame, a hinge bracket on the second eye rim of the main frame, a hinge pin on the second eye rim of the auxiliary frame and engaging said bracket and a pivotally mounted spring controlled catch for retaining the auxiliary frame in a position in which it registers with and conceals the main frame.

9. Spectacles comprising a main frame with eye rims and a bridge, a rigid auxiliary frame consisting of eye rims and a bridge, such auxiliary eye rims and bridge being of the same shape and substantially the same size as the main eye rims and bridge, a rib on one main eye rim, a hinge bracket on the second main eye rim, a sleeve provided with a slot and adapted to engage frictionally said rib, a hinge connecting said sleeve and one eye rim of said auxiliary frame, a hinge pin on the second auxiliary eye rim to engage said hinge bracket, a helical spring arranged around the hinge pin of the hinge connecting the sleeve and the auxiliary frame and having its ends engaging said sleeve and said auxiliary frame respectively, the said helical spring being stressed to move the auxiliary frame around the hinge pins away from the main eye rims, a pivotal catch lever mounted on the main frame and a helical spring acting on the said catch lever.

10. Spectacles comprising a main frame with eye rims and a bridge, a rigid auxiliary frame consisting of eye rims and a bridge, such auxiliary eye rims and bridge being of the same shape and substantially the same size as the main eye rims and bridge, a rib on one main eye rim, a hinge bracket on the second main eye rim, a sleeve provided with a slot and adapted to engage frictionally said rib, a hinge connecting said sleeve and said auxiliary frame, a hinge pin on the second auxiliary eye rim to engage said hinge bracket, a helical spring arranged around the hinge pin of the hinge connecting the sleeve and the auxiliary frame and having its ends engaging said sleeve and said auxiliary frame respectively, the said helical spring being stressed to move the auxiliary frame around the hinge pins away from the main eye rims, a pivotally mounted spring controlled catch lever for retaining the auxiliary frame in a position in which it registers with and conceals the main frame, and shields for concealing the hinges.

11. Spectacles comprising a main frame with eye rims, side joints and a channeled nose bridge, a rigid auxiliary frame consisting of eye rims of the same shape and substantially the same size as the eye rims of the main frame, and a nose bridge which fits in the channeled bridge of the main frame, independent hinge members secured to the main eye rims, independent hinge members secured to the auxiliary eye rims so as to connect the main frame and the auxiliary frame, a catch pin on said auxiliary frame, a catch lever pivotally mounted on a side joint of said main frame and adapted to be engaged by said catch pin to retain the auxiliary frame in register with the main frame, and a helical spring acting on said pivoted catch lever.

12. Spectacles comprising a main frame with eye-rims and a bridge, a rigid auxiliary frame consisting of eye-rims and a bridge, said auxiliary eye-rims and bridge being of the same shape and substantially the same size as the main eye-rims and bridge, a spring controlled catch lever to hold the main frame and the auxiliary frame in a registering position and interengaging members respectively mounted on the main frame and the auxiliary frame for enabling the auxiliary frame to be quickly and hingedly secured to the main frame and rapidly detached therefrom.

13. Spectacles comprising a main frame with eye rims and a bridge, a rigid auxiliary frame consisting of eye-rims and a bridge, said auxiliary eye-rims and bridge being of the same shape and substantially the same size as the main eye-rims and bridge, slidably interengaging members respectively mounted on the main frame and the auxiliary frame for enabling the auxiliary frame to be hingedly secured to the main frame and rapidly detached therefrom, a spring acting to move the auxiliary frame out of register with the main frame, a catch independent of the hinges to hold the main frame and auxiliary frame in registering position, and an independent spring acting upon the said catch.

14. Spectacles comprising a main frame with a pair of eye rims and a nose bridge, a rigid auxiliary frame with a pair of eye rims and a nose bridge, the eye rims and nose bridge of the auxiliary frame being of the same shape and substantially the same size as the eye rims and nose bridge of the main frame and being adapted to register with and conceal such eye rims and nose bridge, independent hinges connecting the upper middle parts of the eye rims of the main and auxiliary frames and serving as the sole support of such auxiliary frame on said main frame, a spring pressed pivotal catch lever movable transversely to the plane of the lenses of said main frame and mounted on one end of the main frame, and a pin mounted on the corresponding end of the auxiliary frame and adapted to engage with said catch lever when the auxiliary frame is in register with the main frame.

JULIUS RHEINBERG.